United States Patent

Minkevich

[15] 3,640,695
[45] Feb. 8, 1972

[54] METHOD OF TREATING MINERALIZED WATER

[72] Inventor: Boris Iosifovich Minkevich, ulitsa Musy Dzhalya, 3, Tashkent, U.S.S.R.

[22] Filed: Nov. 18, 1969

[21] Appl. No.: 877,837

Related U.S. Application Data

[63] Continuation-in-part of Ser. No. 607,651, Jan. 6, 1967, abandoned.

[52] U.S. Cl. ..................................................................71/1
[51] Int. Cl. ..........................................................A01n 7/02
[58] Field of Search..................71/1, 59; 210/42, 51, 52, 53, 210/59, 61; 23/68, 97, 127

[56] References Cited

UNITED STATES PATENTS

| 2,713,749 | 7/1955 | Hult | 71/1 |
| 3,285,849 | 11/1966 | Watanabe et al. | 210/53 X |
| 3,332,767 | 7/1967 | Heins | 71/1 |

*Primary Examiner*—J. L. DeCesare
*Attorney*—Waters, Roditi, Schwartz & Nissen

[57] ABSTRACT

A method of treating natural mineralized water, e.g., ground water, as well as sea water, to be used subsequently for irrigation, according to which lead nitrate is introduced into mineralized water, the precipitated lead sulfates, lead chlorides and lead carbonates are removed, and potassium salts e.g., potassium silicate, are introduced into the water for binding the small amounts of lead salts which remain dissolved in the water. All the precipitated lead salts are collected and regenerated for obtaining lead nitrate.

2 Claims, No Drawings

METHOD OF TREATING MINERALIZED WATER

The present Application is a continuation-in-part of application Ser. No. 607,651, filed Jan. 6, 1967 now abandoned.

1. The present invention relates to irrigation, and more particularly to methods of treating mineralized water, to be used subsequently for irrigation.

There is quite a number of arid regions, where sweet water can be found either in very small amounts, or cannot be found at all. In the latter case only mineralized water can be found in such regions.

The present invention helps to solve technical problems associated with the utilization of natural mineralized water in agriculture for irrigation purposes, and more particularly, with the use for irrigation of saline ground water, specially pumped for irrigation from wells, or of saline water drained from saline grounds by means of vertical or horizontal drainage.

It is also proposed to use for irrigation purposes mineralized water from seas or salt lakes, which has been treated as disclosed in the present invention.

Those skilled in the art of reclamation and amelioration are well aware of the fact, that plants cannot be watered with mineralized water, since it contains salts which are harmful for the plants, and since the use of mineralized water leads to an increase in the amount of salts in the soil, this circumstance adversely affecting the amelioration state of the irrigated land.

Ground mineralized water and sea water feature a predominance of sulfates and chlorides of sodium and magnesium therein. Cases are known, when mineralized water also contains sodium carbonate, as well as slightly soluble calcium sulfate, and calcium bicarbonate. Sulfates and chlorides of sodium and magnesium are harmful for plants, while sodium carbonate proves to be especially toxic in this respect.

2. Known in the art is a chemical method of treating mineralized water. This method is disclosed in U.S. Pat. Nos. 2,546,071 and 2,713,743 to Hult.

The method of treating mineralized water proposed by Hult resides in that silver nitrate is introduced into sea water. The reaction between the silver nitrate and sodium and magnesium chlorides in mineralized water results in the precipitation of silver chloride, while sodium and magnesium nitrates remain in the solution, sea water thus becoming applicable for irrigation purposes. The precipitated silver chloride is proposed to be collected and converted to silver nitrate for reuse.

However, natural mineralized water contain not only chlorides, but also sulfates. In sea water chlorides are predominant, while in some regions ground water contains mostly sulfates. It is possible to introduce such a calculated amount of silver nitrate into mineralized water, that chlorides and sulfates will precipitate therefrom. It should be noted in this connection, that silver sulfate and silver chloride which are formed in the solution feature a considerably different solubility.

Thus, at 20° C. 0.0015 g. of silver chloride can be dissolved in 1 liter of water, while the solubility of silver sulfate in this case will be 7.9 g. Therefrom, provided that silver nitrate is used for precipitating both chlorides and sulfates from the water being treated, silver sulfate will remain therein in the dissolved state, which fact cannot be tolerated, since this costly salt will be wasted with the irrigation water. Should it be even assumed, that in each liter of treated water there would be not 7.9, but only 1 g. of silver sulfate, each 1 m.³ of irrigation water will involve the wastage of 1 kg. of silver sulfate, or of 700 g. of silver. Consequently, it proves unreasonable to treat mineralized water by using silver nitrate with a view to removing not only chlorides, but also sulfates therefrom. From the data published in scientific and technical literature on amelioration and reclamation it is known, that both chlorides and sulfates are harmful for plants. It is indicated, that in the series of sulfides $MgSO_4$, $Na_2SO_4$, $CaSO_4$, magnesium sulfate takes the first place as regards its harmful effect, and is followed by sodium sulfate (mirabilite).

Chlorides, viz., $NaCl$, $MgCl_2$, $CaCl_2$, only slightly differ in their harmful effect. $MgCl_2$, $MgSO_4$ and $Na_2CO_3$ are noted for their high extent of toxicity.

The method proposed heretofore, according to which mineralized water is treated with silver nitrate, is disadvantageous in that only chlorides can be removed from water treated by this method, whereas sulfates, such as sodium sulfate and, especially, magnesium sulfate, cannot be removed therefrom.

An economically expedient, and therefore practically applicable chemical method of treating mineralized water, to be used subsequently for irrigation, can be developed with the use of a cheap and easily available reagent.

Silver nitrate is a reagent too expensive for such a purpose, even if it is generated from silver chloride.

Regeneration operations inevitably involve losses of this precious salt. Losses of silver salts are also inevitable in the course of technological operations associated with treating mineralized water and with watering plants with treated water.

An object of the present invention was to find such an economically expedient chemical method of treating natural mineralized water, which would make it possible to utilize mineralized water in agriculture for irrigation purposes.

Another object of the present invention was to find easily available and inexpensive reagents for treating mineralized water, to be used subsequently for irrigation.

Said objects have been accomplished by a method of treating mineralized water, which, according to the invention, resides in that lead nitrate is introduced into mineralized water in an amount sufficient for stoichiometric reactions to take place between said lead nitrate and sodium and magnesium chlorides and sulfates, and sodium carbonate present in the water being treated. The precipitated lead sulfates, chlorides and carbonates are removed, and potassium salts are introduced into water, which are capable of precipitating the lead salts remaining dissolved therein, in an amount, corresponding to the stoichiometric one. After settling, water, containing sodium and potassium nitrates which are fertilizers, is used for irrigation.

All the precipitates of lead salts are collected for regeneration to lead nitrate, to be reused for treating new batches of mineralized water.

It is preferable to use potassium silicate which is an easily available and cheap reagent as said potassium salt. In this case potassium salts will convert toxic lead salts to potassic fertilizers. Potassium silicate is advantageous also in that it can effect a complete sedimentation of lead salts remaining in the solution in the form of lead silicate which is not soluble in water.

From the following detailed description it will become apparent why lead nitrate has been given reference to.

Chlorides of all the most conventional and cheap metals, such as Fe, Ca, Al, Zn and Ba, are readily soluble in water, and therefore any salt of these metals cannot cause the precipitation of chlorides from mineralized water. Only salts of such rare and precious metals as osmium, thodium, platinum and silver are capable of causing chlorides to precipitate from an aqueous solution. However, salts of these precious metals cannot be employed for treating mineralized water, since in the course of technological operations involved in such treatment these rare and precious reagents will be inevitably lost.

Lead salts are among the number of most conventional and easily available salts that are capable of causing chlorides to precipitate from an aqueous solution. Therefore lead nitrate is proposed to be used as the reagent for treating mineralized water. Lead nitrate has been chosen due to the fact, that this salt is readily soluble in water and can cause the precipitation from the solution of chlorides, sulfates and sodium carbonate, that are toxic for plants.

Lead nitrate reacts with salts present in mineralized water in the following manner:

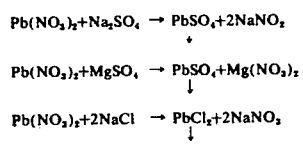

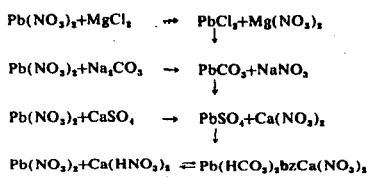

The amount of lead nitrate to be introduced is calculated in accordance with the stoichiometric reactions. This requires the chemical analysis of water to be treated to be performed.

Therefore, due to the action of lead nitrate, sodium carbonate, sodium sulfates and chlorides, magnesium chlorides and sulfates which are toxic for plants, as well as calcium sulfate which is harmless for plants, become decomposed and precipitate from mineralized water in the form of lead salts. Sodium, magnesium and calcium nitrates which form in the solution are nitrogenous fertilizers.

Calcium bicarbonate can also remain in the solution. Calcium bicarbonate will not precipitate from the aqueous solution, since the reaction between these salts will be reversible. Calcium bicarbonate is not toxic for plants, but in case when lead chloride, lead sulfate and calcium bicarbonate are present in the solution, in mineralized water being treated there may form lead bicarbonate which is soluble in water and harmful for plants:

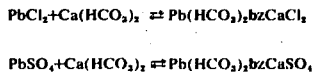

Considering further steps involved in the present method, it should be noted, that after the removal of the precipitated lead salts from water, small amounts of dissolved lead sulfate and lead chloride that are toxic for plants will remain therein. Thus, the solubility of lead chloride at 20° C. is 9.9 g. per liter of water, and that of lead sulfate is 0.041 g. per liter. Water-soluble lead salts are toxic for plants. In case of presence of calcium bicarbonate in water, a certain portion of lead chloride and lead sulfate may yield lead bicarbonate, toxic for plants.

For mineralized water treated with lead nitrate to be applicable for irrigation; said dissolved lead salts must be removed therefrom, and for this purpose we propose to treat mineralized water additionally with potassium salts which are capable of causing lead salts to precipitate from the solution.

The amount of potassium salt required for such reactions is to be calculated also stoichiometrically. As has been pointed out hereinabove, it is most expedient to use potassium silicate as potassium salts.

In the present case potassium silicate will convert lead chloride and lead sulfate that are toxic for plants into potassic fertilizers KCL and $K_2SO_4$ according to the reaction:

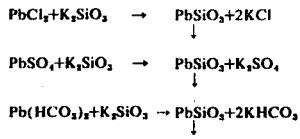

When introducing into the treated water a reagent which removes the remaining lead salts therefrom, it should be taken into account, that the introduced reagent, that is, potassium silicate, say react not only with the remaining lead salts, but also with magnesium and calcium nitrates dissolved in water. The quality of water will not be deteriorated, but the required quantity of the reagent will be somewhat greater than for precipitating the remaining lead salts only.

The course of the proposed method of treating mineralized water can be generally described as follows.

Into a vessel filled mineralized water a reagent, namely, lead nitrate, is introduced with stirring. Lead nitrate may be introduced either in the form of a fine powder, or as a saturated aqueous solution whose temperature may be different. At 20° C. 0.522 kg. of lead nitrate can be dissolved in 1 liter of water, and at 100° C. 1.27 kg. of lead nitrate can be dissolved in the same amount of water.

The quantity of lead nitrate required for the treatment of water is determined in accordance with the results of its chemical analysis, taking into account those chemical reactions that may take place between lead nitrate and those salts which are present in water to be treated.

The mixing of lead nitrate with mineralized water results in a turbid solution. The solution should be allowed to settle, and then either the precipitate should be removed from the vessel, or clarified water should be poured into another vessel. For removing lead salts remaining in the water after its treatment with lead nitrate, said water should be treated with potassium silicate, or with some other potassium salt capable of causing lead salts to precipitate from the aqueous solution.

The amount of the reagent, viz., of potassium salt, to be introduced is determined also in accordance with the results of the chemical analysis of water and by taking into account possible chemical reactions and their equations.

After the second treatment of mineralized water, there will be no salts toxic for plants in it, and such water can be used for irrigation.

The precipitates of lead salts, resulting after the first and second treatments of water, should be collected and regenerated into lead nitrate.

As can be seen from the description of the present invention, easily available and cheap reagents are proposed for treating mineralized water, to be subsequently used for irrigation.

It is of practical importance, that the precipitates of lead salts resulting after the treatment can be regenerated by conventional chemical processes into lead nitrate for reuse as the reagent.

Chemical reactions that take place between the reagent and the salts contained in mineralized water proceed very fast, the resulting poorly soluble lead salts feature a great specific gravity and therefore rapidly precipitate; all these factors facilitating the creation of a high-capacity installation for treating mineralized water. It should be pointed out, that the cost of technological operations required for producing lead nitrate will be moderate, since the main stock for producing lead nitrate will be not lead ores, but lead salts.

For a better understanding of the present invention given hereinbelow is an example of a specific embodiment of the proposed method.

EXAMPLE

In the table that follows an exemplary calculation is given of lead nitrate consumption for the treatment of a sample of 1 liter of ground mineralized water in which the dense residue weighs 28.6 g./l.

The calculation is carried out on the basis of the equations of chemical reactions and the results of water analysis.

| Concentration of salts, g./l. | Quantity of lead nitrate consumed in reactions with salts, grams | Type and quantity of salts obtained as a result of the reactions, grams |
|---|---|---|
| $Na_2SO_4$, 8.65 | 20.16 | $PbSO_4$ 18.43; $NaNO_3$, 10.38 |
| $MgSO_4$, 6.53 | 28.02 | $PbSO_4$ 16.52; $Na(NO_3)_2$, 8.03 |
| NaCl, 12.25 | 34.90 | $PbCl_2$ 29.27; $NaNO_3$, 17.88 |
| $CaSO_4$, 1.21 | 2.94 | $PbSO_4$ 2.70; $CaNO_3$, 1.45 |

From the calculations it follows that for treating 1 liter of mineralized water (with the concentration of salts as specified above), it is required to use 86 g. of lead nitrate, the precipitate consisting of 66.9 g. of lead sulfate and lead chloride, and 37.7 g. of sodium, magnesium and calcium nitrate remaining in the solution. The analysis of mineralized water treated with lead nitrate has shown the quantity of the precipitate to be not 66.9 g., but 65.4 g. of lead salts. After the removal of the precipitate, 1 liter of water contained, besides sodium, magnesium and calcium nitrates dissolved therein, also 1.5 g. of lead chloride and a very small quantity (traces) of lead sulfate.

For precipitating said lead salts from the solution, potassium silicate was added thereinto in an amount of 11 g./l.

Potassium silicate reacted not only with lead chloride and lead sulfate, but also with calcium nitrate and magnesium nitrate, the reactions proceeding as follows:

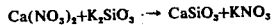

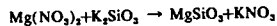

After the introduction of potassium silicate into the solution, 1.5 g. of lead silicate, 5.4 g. of magnesium silicate and 1 g. of calcium silicate precipitated therefrom, while in the solution there formed 0.8 g. of sodium nitrate instead of 1.5 g. of lead salts, 11 g. of potassium nitrate instead of 8 g. of magnesium nitrate, and 1.7 g. of potassium nitrate instead of 1.4 g. of calcium nitrate.

Thus, after the complete treatment of the sample of mineralized water that contained salts as indicated hereinabove, excess salts toxic for plants were removed therefrom, and in 1 liter of said water there formed 39.5 g. of nitrogenous fertilizers, namely, 26 g. of sodium nitrate and 13.5 g. of potassium nitrate.

About 66.9 g. of lead salts were obtained as the precipitate, comprising 37.7 g. of lead sulfate, 27.7 g. of lead chloride and 1.5 g. of lead silicate.

I claim:

1. A method of treating natural mineralized water, containing sodium and magnesium sulfates and chlorides and sodium and-calcium carbonates for subsequent use in irrigation, said method comprising adding lead nitrate to said mineralized water in an amount sufficient for stoichiometric reactions to take place between said lead nitrate and the sodium and magnesium sulfates and chlorides; and the sodium and calcium carbonates present in said water thereby precipitating lead sulfate, lead chloride and lead carbonate and removing said lead salts from the water, adding potassium silicate to the water to convert the remaining dissolved lead salts into a precipitate, the amount of said potassium silicate being in accordance with the stoichiometric requirements to form an aqueous solution, which contains sodium and potassium nitrates and which is suitable for irrigation.

2. A method as claimed in claim 1, further comprising collecting the precipitated lead sulfate, chloride and carbonate, converting same to lead nitrate, and recycling same in treating natural mineralized water.

* * * * *